US011455153B2

(12) United States Patent
Haehnle

(10) Patent No.: US 11,455,153 B2
(45) Date of Patent: Sep. 27, 2022

(54) DYNAMIC INSTANCES SEMANTICS

(71) Applicant: Advanced Micro Devices, Inc., Santa Clara, CA (US)

(72) Inventor: Nicolai Haehnle, Munich (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/544,796

(22) Filed: Aug. 19, 2019

(65) Prior Publication Data

US 2020/0301681 A1    Sep. 24, 2020

Related U.S. Application Data

(60) Provisional application No. 62/820,008, filed on Mar. 18, 2019.

(51) Int. Cl.
    *G06F 8/41*        (2018.01)
(52) U.S. Cl.
    CPC ..................... *G06F 8/433* (2013.01)
(58) Field of Classification Search
    CPC .......................................... G06F 8/433
    USPC .................................. 717/136–167
    See application file for complete search history.

(56) References Cited

U.S. PATENT DOCUMENTS

| | | | | |
|---|---|---|---|---|
| 6,848,100 B1* | 1/2005 | Wu | ...................... | G06F 11/3612 |
| | | | | 714/E11.209 |
| 9,418,616 B2* | 8/2016 | Duluk, Jr. | ............. | G06T 15/005 |
| 2002/0147969 A1* | 10/2002 | Lethin | ................. | G06F 9/45504 |
| | | | | 717/138 |
| 2003/0229485 A1* | 12/2003 | Nishikawa | ............ | G06F 9/4494 |
| | | | | 703/25 |
| 2004/0088691 A1* | 5/2004 | Hammes | ................. | G06F 30/33 |
| | | | | 717/158 |
| 2006/0041872 A1* | 2/2006 | Poznanovic | ............ | G06F 8/447 |
| | | | | 717/140 |
| 2014/0165049 A1* | 6/2014 | Diamos | ................... | G06F 8/453 |
| | | | | 717/156 |

(Continued)

OTHER PUBLICATIONS

Brandis, Marc M., and Hanspeter Mössenböck. "Single-pass generation of static single-assignment form for structured languages." ACM Transactions on Programming Languages and Systems (TOPLAS) 16.6 (1994): pp. 1684-1698. (Year: 1994).*

(Continued)

*Primary Examiner* — Satish Rampuria
(74) *Attorney, Agent, or Firm* — Liang & Cheng, PC

(57) ABSTRACT

A computing system includes a processor and a memory storing instructions for a compiler that, when executed by the processor, cause the processor to generate a control flow graph of program source code by receiving the program source code in the compiler, in the compiler, generating a structure point representation based on the received program source code by inserting into the program source code a set of structure points including an anchor structure point and a join structure point associated with the anchor structure point, and based on the structure point representation, generating the control flow graph including a plurality of blocks each representing a portion of the program source code. In the control flow graph, a block A between the anchor structure point and the join structure point post-dominates each of the one or more divergent branches between the anchor structure point and the join structure point.

20 Claims, 13 Drawing Sheets

(56) References Cited

U.S. PATENT DOCUMENTS

2014/0337848 A1* 11/2014 Llamas .................... G06F 9/52
718/102
2014/0351826 A1* 11/2014 Llamas ................ G06F 9/3826
718/107

OTHER PUBLICATIONS

Smith, Frederick, et al. "Compiling for runtime code generation." Submitted for publication to JFP SAIG (2000).pp. 1-16 (Year: 2000).*

Cui, Zheng, et al. "An accurate GPU performance model for effective control flow divergence optimization." 2012 IEEE 26th International Parallel and Distributed Processing Symposium. IEEE, 2012.pp. 83-94 (Year: 2012).*

Liang, Yun, et al. "An accurate GPU performance model for effective control flow divergence optimization." IEEE Transactions on Computer-Aided Design of Integrated Circuits and Systems 35.7 (2015): pp. 1165-1178. (Year: 2015).*

Sampaio, Diogo, et al. "Divergence analysis." ACM Transactions on Programming Languages and Systems (TOPLAS) 35.4 (2014): pp. 1-36. (Year: 2014).*

Allen, Frances E. "Control flow analysis." ACM Sigplan Notices 5.7 (1970): pp. 1-19. (Year: 1970).*

Oh, Nahmsuk, Philip P. Shirvani, and Edward J. McCluskey. "Control-flow checking by software signatures." IEEE transactions on Reliability 51.1 (2002): pp. 111-122. (Year: 2002).*

Ottenstein, Karl J., and Linda M. Ottenstein. "The program dependence graph in a software development environment." ACM Sigplan Notices 19.5 (1984): pp. 177-184. (Year: 1984).*

Kessenich, J., Ouriel, B., & Krisch, R. (2018). SPIR-V Specification Version 1.3, Revision 7, Khronos Group, 20, 26, 239.

* cited by examiner

DYNAMIC INSTANCES SEMANTICS

RELATED APPLICATIONS

This application claims priority to U.S. Provisional Application No. 62/820,008, filed on Mar. 18, 2019, which is incorporated by reference herein in its entirety.

BACKGROUND

Compilers convert program code written in higher-level programming languages to a set of instructions in a target language (e.g., assembly language, object code, machine code, etc.) that can be executed by a processor. During the compiling process, an intermediate representation (IR) of the source program code is used internally by the compiler for tasks such as optimization and translation. Ideally, an IR represents the original source code without loss of information, and is independent of the source language and the target language. One type of IR is generated by transforming the original source code of the program into a graph structure that allows the program control flow to be analyzed and optimized prior to being converted to a sequence of machine-executable instructions. Compilers using the IR in this way are able to generate the IR from a variety of different source languages, and to generate, from the IR, the compiled executable instructions for many different target architectures.

BRIEF DESCRIPTION OF THE DRAWINGS

The present disclosure is illustrated by way of example, and not by way of limitation, in the figures of the accompanying drawings.

DETAILED DESCRIPTION

Figure 1:
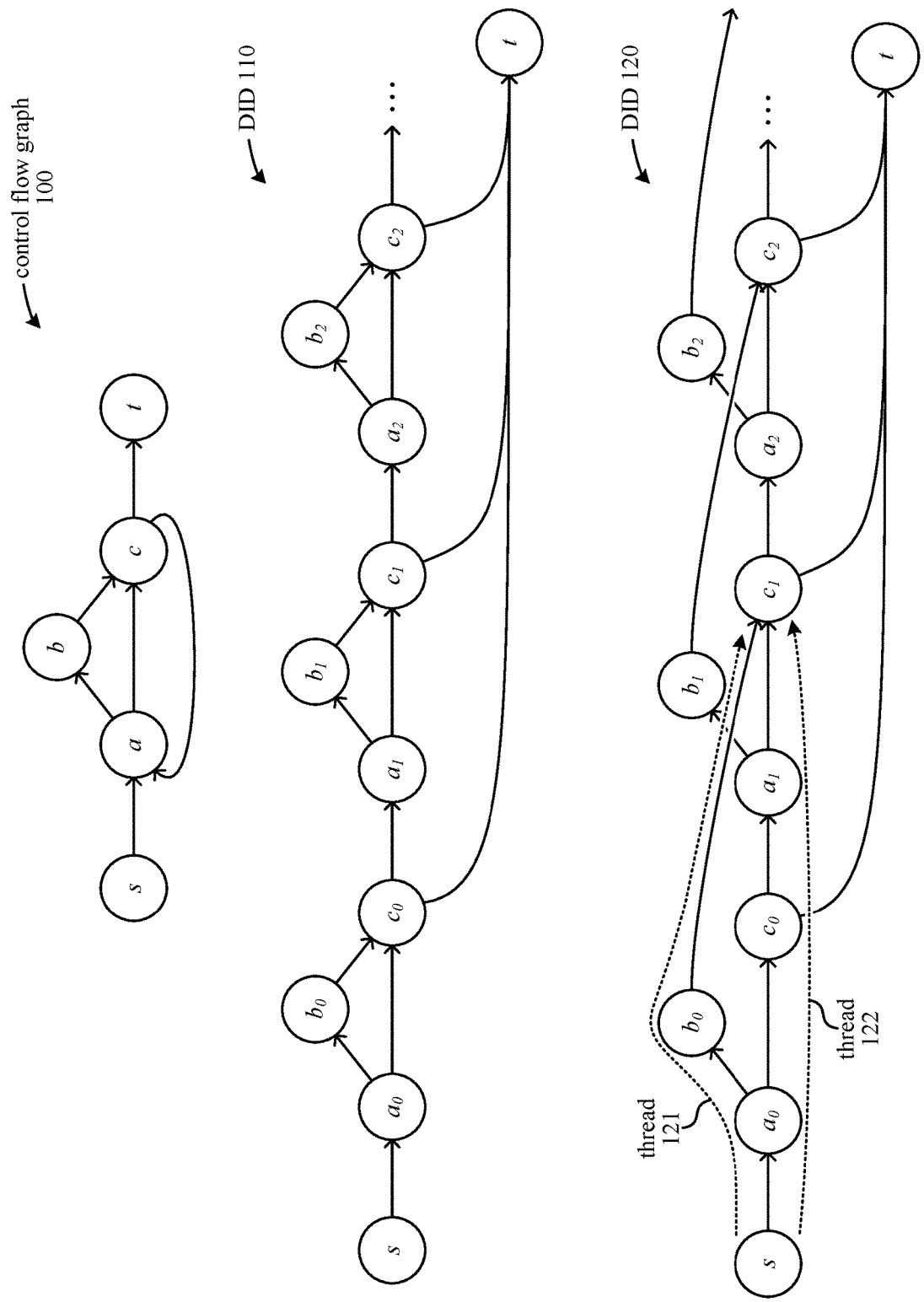
FIG. 1 illustrates a control flow graph and dynamic instances directed acyclic graphs (DIDs) for a program, according to an embodiment.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

Some programming languages and their execution environments have a parallel execution model (e.g., single instruction, multiple thread (SIMT), single program, multiple data (SPMD), etc.) in which groups of threads are executed together and can participate in fine-grained communication with each other in cross-lane or subgroup operations. These operations are featured in high-level graphics processing unit (GPU) programming languages and also enrich parallel programming languages that target central processing unit (CPU) single instruction, multiple data (SIMD) execution. Cross-lane or subgroup operations implement fine-grained communication between currently active lanes (i.e., threads) within a subgroup of threads. One example of a cross-lane operation is the ballot( ) function; its use is shown below in Table 1.

TABLE 1

Ballot example

| | |
|---|---|
| 1 | uvec4 bitmask1; |
| 2 | for (;;) { |
| 3 | ... |
| 4 | if (...) { |
| 5 | bool value = ...; |
| 6 | bitmask1 = ballot(value); |
| 7 | break; |
| 8 | } |
| 9 | ... |
| 10 | } |
| 11 | uvec4 bitmask2 = ballot(value); |

In the execution model of graphics shader languages, many threads of execution are launched in parallel in supergroups (which correspond to waves or warps in hardware). In these supergroups, one instruction at a time is applied to multiple threads or lanes of execution. When control flow diverges (i.e., when different threads within a supergroup take different paths through the control flow graph (CFG) of the program, only a subset of lanes are active during execution of the conditional block. The ballot( ) function returns a bitmask in which a bit is set if and only if the corresponding thread of the supergroup (according to an implementation-defined mapping of threads to bit indices) is active and its argument value is true.

Which subsets of threads are considered active together can affect the correctness of programs and should therefore be predictable by programmers working in a high-level language. In the above example in Table 1, for the first ballot in line 6, threads should be considered active together if and only if they execute the ballot in the same loop iteration, while all threads of the entering supergroup should be considered to be active together for the second ballot in line 11. In general, the bits set in bitmask1 are a (potentially proper) subset of those set in bitmask2. However, unexpected behavior when performing cross-lane operations can arise as a result of actions taken by the compiler (e.g., transforming the CFG for optimization), execution timing, etc.

Such unintuitive and non-deterministic behavior of programs can be described with reference to a dynamic instances directed acyclic graph derived from a CFG of the program. A directed acyclic graph (DAG) includes a set of vertices and directed arcs, with each vertex representing a basic block in the CFG, and with the directed arcs connecting the vertices to represent the control flow between the basic blocks. In a dynamic instances DAG (DID), a vertex is instantiated for each traversal of the corresponding block in the CFG.

FIG. 1 illustrates a CFG and two possible DIDs for a program with a loop containing an if statement, according to an embodiment. The CFG 100 includes blocks s, a, b, c, and t. The if statement resides in block a and determines whether program flow continues to block b or c. The loop is established by a backward edge from c to a. The top DID 110 describes a flow of execution that would produce the expected behavior of cross-lane operations, based on the semantics reflected in the original high-level program source code.

In contrast, the bottom DID 120 describes an execution flow in which loop iterations no longer line up after divergence at the if statement in block a. A thread 121 which passes through b in the first loop iteration (where instances in the first loop iteration are designated by '0' subscripts) executes the dynamic instance $c_1$ together with a thread that executes the bottom of the loop body (i.e., block c) for the second time (i.e., $c_1$) after not having taken the branch to b on either iteration. In practice, a hardware implementation that only reconverges threads opportunistically may produce an execution pattern as shown in DID 120, even though the resulting behavior of any cross-lane operations is probably not expected by the programmer (e.g., threads 121 and 122 would not be expected to execute together). Furthermore, the choice of realized DID in such an implementation may be non-deterministic and subject to changing between program executions based on subtle timing differences.

In addition, certain optimizations performed by compilers can also lead to unexpected behavior when cross-lane operations are used. In particular, conditional hoisting, conditional sinking, basic jump threading, nested break, nested loops vs. continue, deeply nested break, and other scenarios can present challenges for an optimizing compiler when compiling program source code that includes one or more cross-lane operations.

In one embodiment, the intended semantics for cross-lane operations in the program source code are preserved by inserting a set of structure point intrinsic function calls into the source code during the compiling process. During the compiling process, the structure point (spoint) intrinsics are replaced with post-dominating join (pjoin) function calls. The resulting pjoin representation is converted to a reconverging CFG, then to a wave level CFG that contains instructions for handling execution and rejoin masks for controlling execution of threads in the wave or warp. During this compiling process, transformations of the CFG (i.e., for optimization, reconvergence, etc.) are constrained by the spoint or pjoin calls so that cross-lane operations function as intended.

Figure 2:
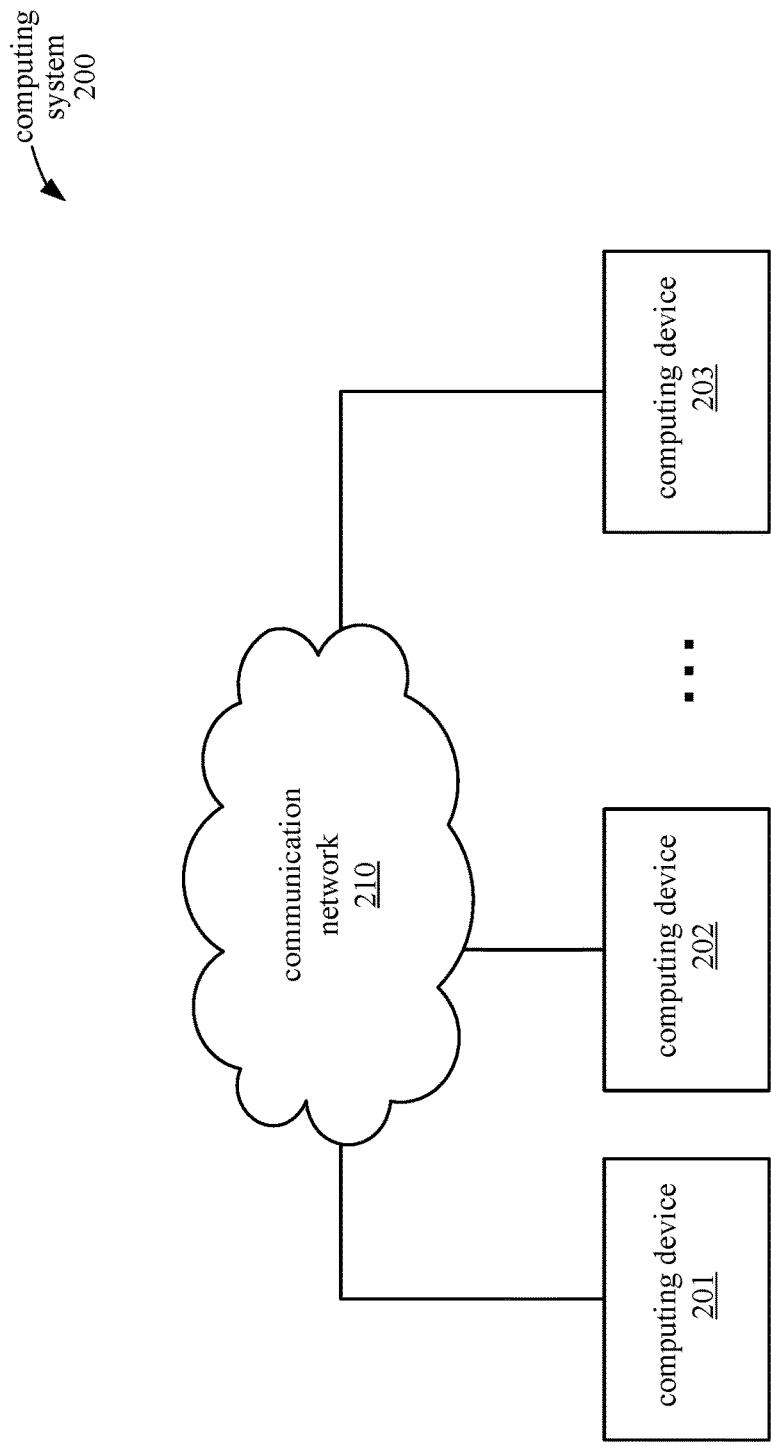
FIG. 2 illustrates a computing system, according to an embodiment.

FIG. 2 illustrates an embodiment of a computing system 200 in which the compiling process is performed. Computing system 200 includes a set of one or more computing devices 201-203 (e.g., NUMA nodes, servers, mobile devices, etc.) that are connected to each other via a communication network 210. Each of the computing devices 201-203 has processing and memory storage capabilities. In one embodiment, the computing system 200 is contained within a single physical enclosure, and the communication network 210 is a bus or system interconnect connecting the computing devices 201-203 within the enclosure. For example, the computing devices 201-203 can include processing units such as GPUs, central processing units (CPUs), field programmable gate arrays (FPGAs), etc. on the same board or on separate carrier boards that are connected to each other via a backplane. In one embodiment, the components in the computing system 200 are contained in separate physical enclosures and are geographically distributed. For example, the computing devices 201-203 can represent individual servers, personal computers, mobile devices, etc. that are connected to each other via a wide-area network (WAN) such as the Internet, a local-area network (LAN), wireless network, or other communication network 210. In one embodiment, the computing devices 201-203 represent the same type or similar types of devices; alternatively, the computing devices 201-203 are different types of devices.

Figure 3A:
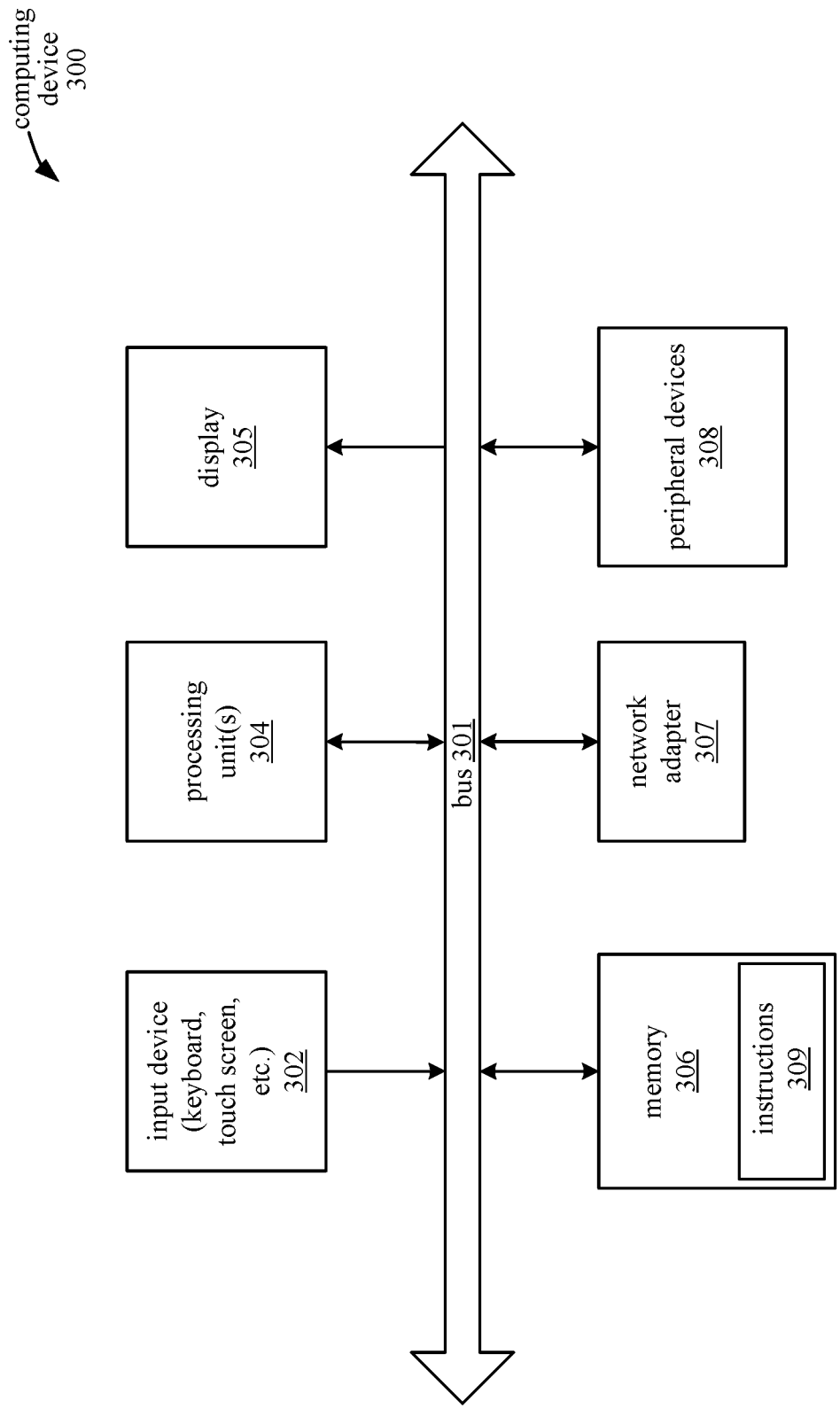
FIGS. 3A and 3B illustrate a computing device, according to an embodiment.

FIG. 3A illustrates an embodiment of a computing device 300 within the computing system 200 in which the compiling process is performed. In general, the computing device 300 is embodied as any of a number of different types of devices, including but not limited to a laptop or desktop computer, mobile device, server, etc. The computing device 300 includes a number of components 302-308 that communicate with each other through a bus 301. In computing device 300, each of the components 302-308 is capable of communicating with any of the other components 302-308 either directly through the bus 301, or via one or more of the other components 302-308. The components 301-308 in computing device 300 are contained within a single physical enclosure, such as a laptop or desktop chassis, or a mobile phone casing. In alternative embodiments, some of the components of computing device 300 are embodied as peripheral devices such that the entire computing device 300 does not reside within a single physical enclosure.

The computing device 300 also includes user interface devices for receiving information from or providing information to a user. Specifically, the computing device 300 includes an input device 302, such as a keyboard, mouse, touch-screen, or other device for receiving information from the user. The computing device 300 displays information to the user via a display 305, such as a monitor, light-emitting diode (LED) display, liquid crystal display, or other output device.

Computing device 300 additionally includes a network adapter 307 for transmitting and receiving data over a wired or wireless network. Computing device 300 also includes one or more peripheral devices 308. The peripheral devices 308 may include mass storage devices, location detection devices, sensors, input devices, or other types of devices used by the computing device 300.

Computing device 300 includes one or more processing units 304, which in the case of multiple processing units 304 are capable of operating in parallel. The processing unit(s) 304 are configured to receive and execute instructions 309 that are stored in the memory subsystem 306. In one embodiment, each of the processing unit(s) 304 includes multiple processing cores that reside on a common integrated circuit substrate. Memory subsystem 306 includes memory devices used by the computing device 300, such as random-access memory (RAM) modules, read-only memory (ROM) modules, hard disks, and other non-transitory computer-readable media.

Some embodiments of computing device 300 may include fewer or more components than the embodiment as illustrated in FIG. 3. For example, certain embodiments are implemented without any display 305 or input devices 302. Other embodiments have more than one of a particular component; for example, an embodiment of computing device 300 could have multiple buses 301, network adapters 307, memory devices 306, etc.

Figure 3B:
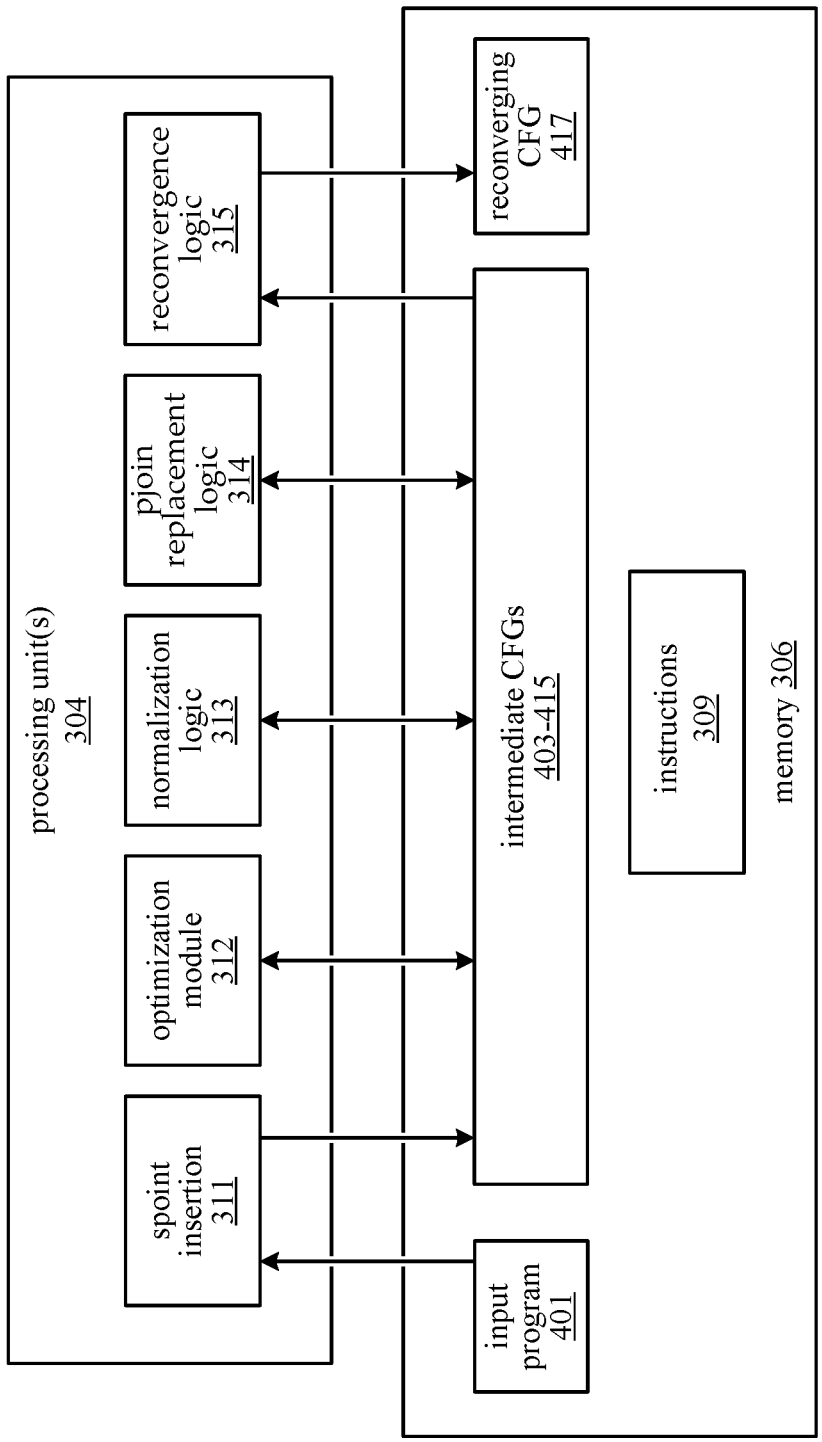

FIG. 3B illustrates physical components in the computing device 300 used to transform an input program 401 to a reconverging CFG 417, according to an embodiment. The components 311-315 are implemented in the processing unit 304 as hardware circuitry, software, or a combination of hardware and software. For example, the components 311-315 in one embodiment are implemented as software modules by executing instructions 309 recorded on a non-transitory computer readable storage medium in the memory 306, and/or as hardware accelerators, logic, and/or other physical circuit components. In one embodiment, the components 311-315 are components of a compiler that receive an input program 401 and transform it sequentially into a number of intermediate CFGs 403-415 and into a reconverging CFG 417 stored in memory 306. The spoint insertion logic 311 receives an input program 401 and inserts structure points in the program source code 401. Optimization module 312 performs compiler optimizations on one or more of the intermediate CFG stages (e.g., 403 and 411). Normalization logic 313 normalizes the intermediate CFG 405. After normalization, pjoin replacement logic 314 replaces the previously inserted structure points in a CFG 407 with pjoins. Reconvergence logic 315 modifies CFG 413 to a reconverging form and inserts mask handling instructions for wave level control flow.

Figure 4:
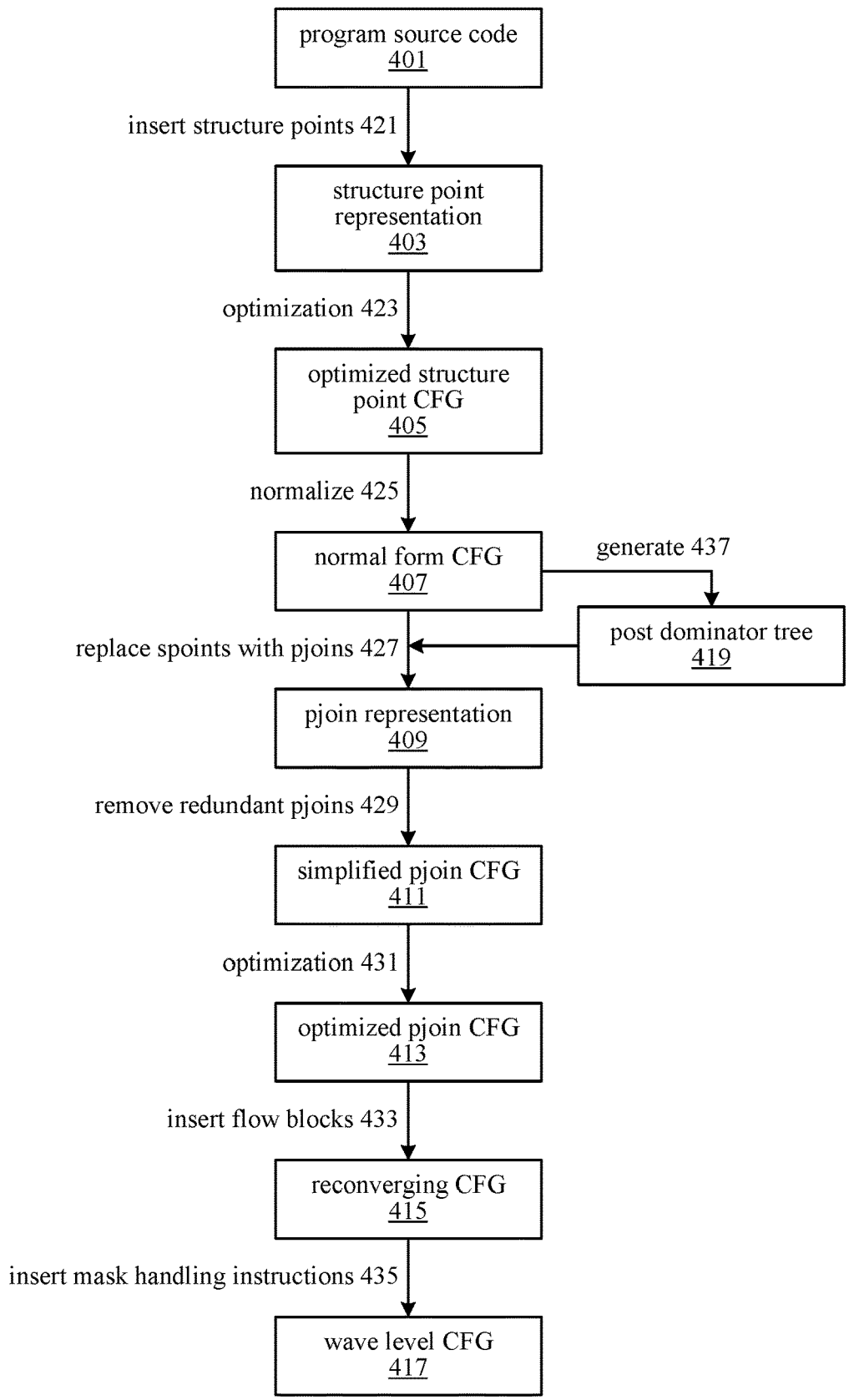
FIG. 4 illustrates stages in a transformation of a control flow graph, according to an embodiment.

FIG. 4 illustrates these stages in the transformation of the original program source code 401 to a reconverging CFG 415 as performed in the processing unit(s) 304, according to an embodiment. The transformation process uses spoints and pjoins to preserve the intended semantics of cross-lane operations in the original source code 401. The spoint insertion logic 311 converts the program source code 401 to a structure point representation 403 by inserting 421 a set of spoints in the source code 401. The optimization module 312 then performs optimizations 423 on the resulting spoint representation 403 to generate an optimized spoint CFG 405. The optimizations 423 can include program transforms such as peephole optimizations, global code motion, loop optimizations, etc.

Normalization logic 313 generates a CFG 407 in normal form by normalizing 425 the optimized spoint CFG 405, then the spoints in the CFG 407 are replaced 427 with pjoin calls to generate a pjoin representation 409 by pjoin replacement logic 314. The replacement 427 of spoints with pjoins is performed based on a traversal of the post-dominator tree 419 generated 437 from the normal form CFG 407 to determine the placement of the inserted pjoin calls. The pjoin replacement logic 314 also removes redundant pjoins 429, and the resulting simplified pjoin CFG 411 is further optimized 431 by the optimization module 312, similar to optimization 423.

The reconvergence logic 315 transforms the optimized pjoin CFG 413 into a reconverging CFG 415 by inserting flow blocks 433 as needed. Instructions for handling executions masks, rejoin masks, etc. are inserted to transform the reconverging CFG 415 to a wave level CFG 417.

Figure 5:
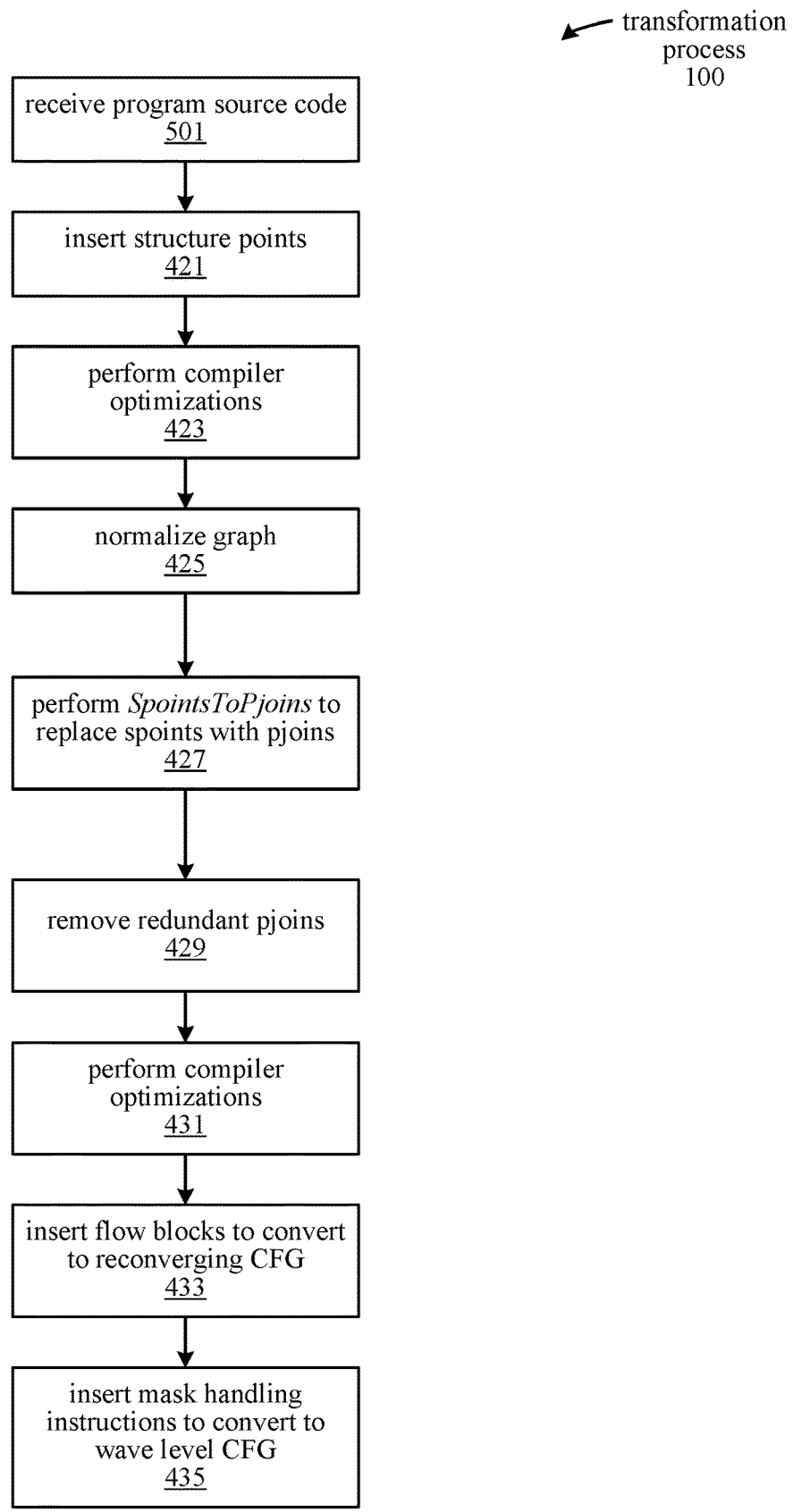
FIG. 5 illustrates a process for transforming a control flow graph, according to an embodiment.

FIG. 5 is a flow diagram illustrating the transformation of the program source code 401 into a reconverging wave level CFG 417 as a process 500, according to an embodiment. In one embodiment, the process 500 is performed in a compiler implemented in the processing unit 304 according to instructions 309 and/or using the components 311-315. At block 501, the program source code 401 is received by the compiler. The compiler inserts the spoint intrinsics into the received source code, as provided at 421. The compiler performs optimizations at 423 and normalizes the optimized graph at 425. The S$_{POINTS}$T$_{O}$P$_{JOINS}$ subroutine is performed at block 427 to replace the spoints with pjoins. Redundant pjoin calls are removed at block 429. The compiler performs additional optimizations at 431 and inserts flow blocks as needed to convert the optimized CFG to a reconverging form at block 433. The compiler then prepares the reconverging CFG for handling wave level control flow at block 435.

The structure point approach to enforcing reconvergence of threads at appropriate blocks provides structure point intrinsic functions including the anchor structure point (sanchor( )), join structure point (sjoin(token)), and tip structure point (stip(token)). Calls to structure point intrinsics are collectively referred to herein as "structure points". A call to an anchor, tip, or join structure points intrinsic function is referred to as an "sanchor", an "stip", or an "sjoin", respectively. In the context of a DID G that includes a set of vertices V and arcs A, "an sjoin a $\in$ A" refers to an arc a that is labelled with a call to the sjoin intrinsic and is an element of A; the other intrinsics can be referenced similarly.

Calls to the sanchor intrinsic return a token value that is passed as an argument in calls to any sjoin and stip that correspond to (i.e., are anchored by) the sanchor. In static single assignment (SSA) form, token values are passed directly to the consuming intrinsic calls (e.g., sjoin and stip) and are not used in any other way. A program is malformed if it contains phi nodes of token values. Hence, an sanchor dominates all structure points which it anchors. An sanchor is considered as anchoring itself. A program containing structure points has undefined behavior unless the following conditions are satisfied:

Anchor region nest: Given an sanchor $\bar{a} \in \bar{A}$ in the CFG, the region of a is the subset of the dominance region of $\bar{a}$ from which structure points anchored by $\bar{a}$ are reachable. If the region of $\bar{a}$ contains a structure point $\bar{b}$ anchored by some other sanchor $\bar{c}$, then $\bar{a}$ dominates $\bar{c}$.

Loop structure: Every cycle that contains a structure point also contains its anchor. This does not imply that all structure points are contained in the same loops as their respective anchors.

Table 2 below illustrates a structure point representation showing the locations at which structure points have been inserted in program source code that includes a nested break.

TABLE 2

| Nested break structure point example |
| --- |
| 1  outer = Sanchor( ); |
| 2  for (;;) { |
| 3      inner = Sanchor( ); |
| 4      ... |
| 5      if (...) |
| 6          break; |
| 7      ... |
| 8  } |
| 9  ... |
| 10  Stip(inner); |
| 11  ... |
| 12  Sjoin(outer); |

The stip in line 10 ensures that cross-lane operations after the high-level loop body (i.e., line 9, after the loop in lines 2-8) but before the stip will execute separately for threads breaking the loop in different iterations. Thus, the stip is used to solve the problem in which threads breaking from the loop in different iterations could possibly execute the line 9 operations together, which would result in unexpected behavior if any cross-lane operations are used in line 9. The outer sjoin in line 12 ensures that threads executing the sanchor together in line 1 reconverge prior to reaching the sjoin in line 12.

In general, a conformant DID g having a set of vertices V and arcs A that is correctly generated for a structure point representation has the following properties:

Sjoin convergence: Given that $b_1, b_2 \in A$ are instances in the DID of the same sjoin $\bar{b} \in A$ that is anchored in an sanchor $\bar{a}$, if there is an instance a of $\bar{a}$ from which both $b_1$ and $b_2$ are reachable without passing through another instance of $\bar{a}$, then $b_1 = b_2$. That is, $b_1$ and $b_2$ are the same instance in the DID.

Stip non-convergence: Given that $a_1, a_2 \in A$ are instances in the DID of the same sanchor $\bar{a} \in A$, and b is an instance in the DID of an stip anchored in $\bar{a}$, then if b is reachable from both $a_1$ and $a_2$ without passing through another instance of $\bar{a}$, then $a_1 = a_2$. That is, $a_1$ and $a_2$ are the same instance in the DID.

Figure 6:
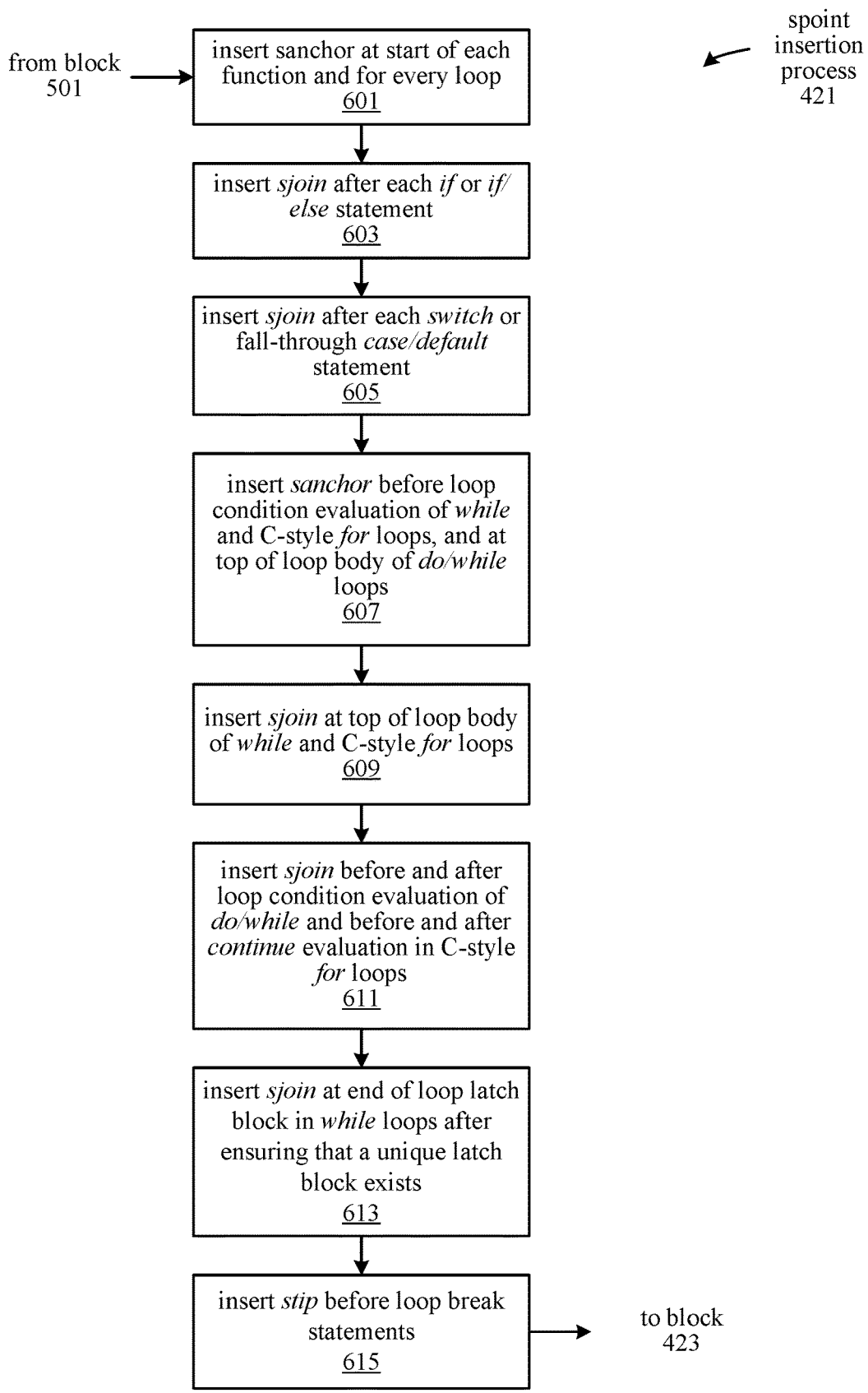
FIG. 6 illustrates a process for inserting structure points in a control flow graph, according to an embodiment.

FIG. 6 is a flow diagram illustrating the process 421 for inserting spoints into the received program source code, according to an embodiment. At block 601, an sanchor is inserted at the start of each function and for every loop in the received program source code 401. In the following blocks 603-615, additional structure points are inserted and anchored to the sanchor of the innermost loop that encloses the structure point being inserted.

At block 603, an sjoin is inserted after each if or if-else statement in the program source code 401. At block 606, an sjoin is inserted after each switch statement and after each case or default label that is a fall-through destination for the switch. An sanchor is inserted before the evaluation of the loop condition of while-loops and C-style for-loops, and at the top of the loop body of do-while-loops, as provided at 607. At block 609, an sjoin is inserted at the top of the loop body of while-loops and C-style for-loops.

An sjoin is inserted before and after the evaluation of the loop condition of each do-while loop, as well as before and after the evaluation of the continue expression of C-style for loops, as provided at 611. For each while loop, an sjoin is inserted at the end of the loop latch block (a block having a backward branch to the header of the loop) after ensuring that a unique latch block exists, in case there are continue statements, as provided at 613. At block 615, an stip is inserted before every loop break statement in the program source code 401. Variations of the insertion process 421 are possible; for example, some unnecessary sjoins can be omitted directly, such as when loop conditions are evaluated in a single basic block without divergence. Also, the structure point insertions described above can occur in different orders in different embodiments.

Table 3 shows a structure point representation generated from program source code that includes two if conditional blocks beginning at lines 3 and 7. The original program source code (i.e., without the structure points at lines 1, 6, and 10) results in an unstructured CFG due to jump threading, in which it is unclear which threads will execute together for purposes of cross-lane communications. With the added sanchor and sjoin structure points, jump threading is avoided in the resulting CFG. The sjoins at lines 6 and 10 are anchored by the sanchor at line 1 via the token tok; thus, all threads active at the sanchor are rejoined at or prior to reaching the sjoins. This structure is maintained when the compiler optimizations 423, following block 615, are performed on the structure point representation.

TABLE 3

Jump threading example

| | |
|---|---|
| 1 | tok = Sanchor( ); |
| 2 | bool guard_flag = true; |
| 3 | if (cond) { |
| 4 |     guard_flag = ...; |
| 5 | } |
| 6 | Sjoin(tok); |
| 7 | if (guard_flag) { |
| 8 |     use(ballot(...)); |
| 9 | } |
| 10 | Sjoin(tok); |

In one embodiment, the transformation process 427 for replacing structure points (spoints) with post-dominating joins (pjoins) operates on a program in a normal form; accordingly, the program is normalized at block 425. The program is in a normal form when the following conditions are satisfied:

(1) The structure points of each basic block all have the same anchor.

(2) The program is reducible; that is, all loops are natural such that if (X, Y) is a backward edge, then X is dominated by Y.

(3) Every loop in the program has a unique exit block, such that all arcs leaving the loop branch to the unique exit block. The loop header dominates the exit block.

(4) Every loop has a unique latch block and therefore also has a unique backward edge.

(5) Every loop has a pre-header; that is, for each loop, the program includes a basic pre-header block P whose only successor is the loop header H, and the only incoming arcs of H are from P and the loop latch block.

(6) Every sanchor a has a designated post-dominator B such that all structure points anchored by a are post-dominated by B, and every cycle in the CFG that contains a also contains B. When the sanchor a is in a loop, threads that are active together at the sanchor a will also be active together at B, which post-dominates a, before the next iteration of the loop. The presence of the post-dominating block B provides a location for a pjoin to be inserted at a later stage to enforce reconvergence of the anchored threads.

Figure 7:
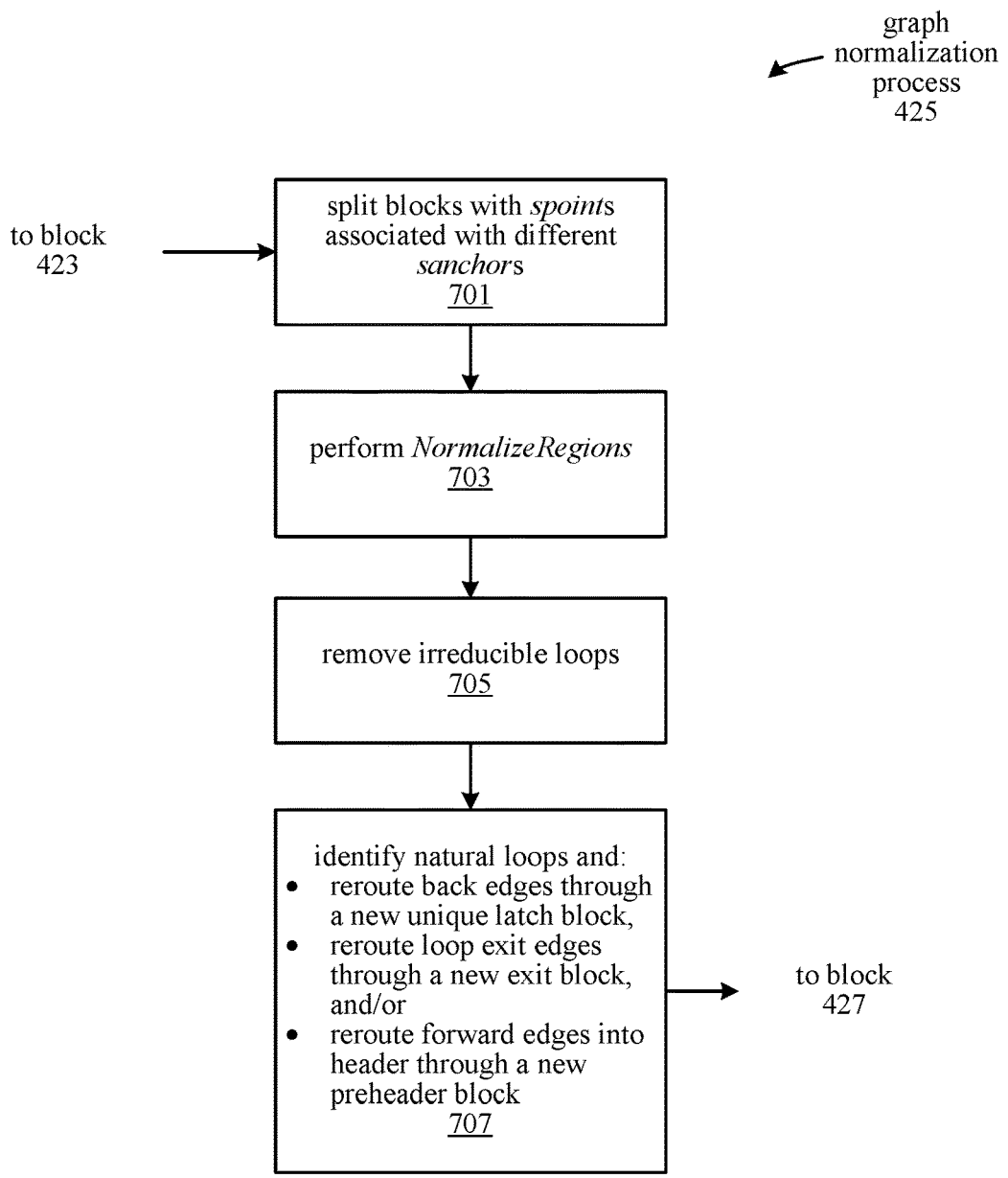
FIG. 7 illustrates a process for normalizing a control flow graph, according to an embodiment.

FIG. 7 illustrates a normalization process 425 performed by a compiler for converting an arbitrary control flow graph for a program into a normal form that adheres to the above normal form conditions 1-6. The graph normalization process 425 follows block 423. At block 701, blocks containing structure points associated with different sanchors are split so that the structure points of each basic block in the program all have the same anchor, in accordance with the normal form condition 1. At 703, normal form condition 6 is established by performing the NORMALIZEREGIONS routine described below.

At 705, irreducible loops in the program are removed to establish the normal form condition 2. At 705, the normal form conditions 3, 4, and 5 (providing that every loop has a unique exit block, a unique latch block, and a preheader block) are established by using loop analysis to identify natural loops in the program, and rerouting backward edges through a new unique latch block, rerouting loop exit edges through a new unique exit block, and/or rerouting forward edges into the header through a new preheader block, as appropriate. The region normal form is established before rerouting loop back and exit edges, as such rerouting can otherwise destroy the dominance relation between structure points and their anchors.

Table 4 shows the NORMALIZEREGIONS routine corresponding to Block 703 in FIG. 7, according to an embodiment. NORMALIZEREGIONS determines a region for each anchor structure point by traversing the CFG backwards starting from the associated join and/or tip structure points.

TABLE 4

NORMALIZEREGIONS

```
1   anchor[B] ← ε for all basic blocks B
2   Order SANCHORS using the dominator tree such that if a dominates b, then a
    comes after b
3   for each SANCHOR a in that order
4       do A ← basic block containing a
5           nested ← ∅
6           region ← basic blocks with structure points anchored in a
7           Q ← region \ {A}
8           while Q , ∅
9               do Choose some B ∈ Q and remove it from Q
10                  for predecessors P of B
11                      do if anchor[P] ≠ ε
12                          then if anchor[P] ∉ nested
13                              then nested ← nested ∪{anchor[P]}
14                                  Q ← Q ∪ {anchor[P]}
15                          elseif P ∉ region
16                              then region ← region ∪{P}
17                                  if P ≠ A
18                                      then Q ← Q ∪ {P}
19          X ← arcs going from region to outside region ∪ nested \{A}
20          Reroute all arcs in X through a new basic block F
21          anchor[F ] ← A
```

In general, anchor[B] identifies an sanchor in block B, if such an sanchor exists. In line 1 of NORMALIZEREGIONS, the sanchor for each basic block B is assigned a value E, which is a placeholder value indicating that no anchor has yet been found for the basic block. In line 2, an ordering is established for the sanchors so that for each pair of blocks a and b, if a dominates b in the CFG, then a comes after b in the ordering. A region (i.e., a set of blocks) is determined for each of the sanchors according to the ordering, in the subsequent lines 3-18.

In line 5, a set of blocks nested is initialized as a null set. While traversing backward from the associated structure points of sanchor A, regions that have already been traversed and assigned to a different sanchor in a prior iteration of the "for each" loop have their sanchor blocks added to the nested set, and redundant traversal of these regions is skipped.

In line 6, the basic blocks having structure points (e.g., sjoin and stip calls) anchored in the sanchor a are added to the region of a, since these structure points are already known to be in the region of their sanchor a. Basic block A containing the sanchor a is also added to region, since a is considered as anchoring itself. In line 7, the basic blocks in region, except for A, are assigned to a set Q. In the subsequent lines 8-18, Q is used to keep track of blocks found by the traversal that should be visited and have not yet been visited. Lines 8-18 traverse the CFG backward starting from the blocks in Q (which initially includes blocks containing the structure points anchored in a) until the block A containing the sanchor a is reached.

Starting from a block B selected from Q (as provided at line 9), the NORMALIZEREGIONS routine considers each predecessor P of the selected block B, as indicated in line 10. In lines 11-14, nested sanchor regions that have already been traversed are detected and skipped. Line 11 determines whether the predecessor block P is associated with an sanchor. If the predecessor block P has a structure point associated with an sanchor, then anchor[P] returns the sanchor rather than the placeholder value E. If P has an sanchor, the sanchor's region is nested in the region of the current sanchor a, since inner anchor regions are processed prior to the outer regions in which they are contained due to the ordering of anchors using the dominator tree in line 2.

At line 12, if the anchor block of P is not already in the nested set, then it is added to nested, as provided at line 13. Since the anchor block of P was not previously added to nested, it was not previously visited; therefore, it is added to Q (at line 14) to be visited in a subsequent iteration.

At line 15, if P is not already an element in the region of a, then P is added to region as provided at line 16, since P is reachable from B. At line 17, if P is not equal to A, then P is added to Q to be visited in a subsequent iteration. However, if P is equal to A, then the backward traversal is complete since block A containing the sanchor a has been reached.

Once all the basic blocks in the region for a have been determined by lines 8-18, line 19 assigns a set X of arcs from blocks inside region to blocks outside a set of blocks including region and nested and excluding A. In line 20, these arcs are rerouted through a new flow block F. That is, for each arc in X from an origin block to a destination block, the arc is replaced with a first arc from the origin block to F and a second block from F to the destination block. The new flow block F post-dominates all blocks in region, thus establishing the normal form condition 6.

At line 21, A is assigned as the anchor block for the new flow block F, so that the newly processed region is skipped if and when an outer region containing region is traversed in a subsequent iteration. In other words, the newly processed region could be a nested region for a subsequently processed outer region; in this case, line 11 in the subsequent iteration identifies A as the anchor block of F upon reaching F, and repeated traversal of region is skipped as previously described.

After a region has been determined for each of the anchor structure points in the program (per lines 3-18) and the outgoing arcs from their respective regions are rerouted (per lines 19-20), the normal form condition 6 is established. The NORMALIZEREGIONS routine thus operates as part of the graph normalization process 425 to transform the optimized structure point CFG 405 to a CFG 407 in normal form.

Once in normal form, the set of structure points in the program are replaced with a set of post-dominating join statements (pjoins) according to the SPOINTSTOPJOINS routine, which corresponds to block 427 in the overall transformation process 100. The SPOINTSTOPJOINS routine is shown below in Table 5.

TABLE 5

SPOINTSTOPJOINS

```
1   color[B] ← red if B contains an SANCHOR or SJOIN or B is the preheader or latch
    block of a loop; white otherwise
2   for all basic blocks B in post-order traversal of the dominator tree
3       do if color[B] = white or B is the entry block
4           then continue
5       if idom(B) is post-dominated by B
6           then color[idom(B)] ← max{color[idom(B)], yellow}
7               if color[B] = red
8                   then Insert PJOIN at the top of B
9                   continue
10      if idom(B) is the unique predecessor of B
11          then if idom(B)'s innermost containing loop also contains B
12              then color[idom(B)] ← max{color[idom(B)], red}
13                  continue
14      color[idom(B)] ← max{color[idom(B)], yellow}
15      Reroute control flow for B
```

A pjoin statement causes threads to reconverge that had previously branched at branches that are post-dominated by the pjoin statement. The SPOINTSTOPJOINS routine inserts pjoin statements to ensure that, for each sjoin in the program, threads are reconverged prior to reaching the sjoin. In some cases, the SPOINTSTOPJOINS routine inserts new basic blocks to ensure that post-dominating blocks (that post-dominate the aforementioned branches) exist in which the pjoin statements can be placed. The SPOINTSTOPJOINS routine traverses the blocks in a dominator tree for the program in reverse, assigning colors to the blocks to keep track of whether control flow at each block should be modified (i.e., whether threads should be rejoined at the block). In the above embodiment of SPOINTSTOPJOINS, a basic block B is white if nothing needs to be done for B, yellow if B will post-dominate a merged block at which threads are rejoined, and red if B itself will be merged. When a basic block is "merged", the conformant DID of the program has only a single instance of the block for each instance of the header block of the smallest enclosing loop that includes the merged block. The colors white, yellow, and red are ordered; in particular, white<yellow<red, such that, for example, max{yellow, red}=red.

At line 1 of the SPOINTSTOPJOINS routine, each basic block B in the program is assigned a color of either white or red. The basic block is assigned the color red at line 1 if threads should reconverge prior to reaching the block. Blocks containing an sjoin are red. Sanchor structure points are also red to ensure that threads are already reconverged upon reaching the sanchor. Since stip structure points prevent spurious reconvergence of threads, ensuring that the threads are already reconverged at the sanchor helps prevent spurious reconvergence between the sanchor and the stip. Loop preheader blocks (i.e., blocks preceding a loop) and latch blocks (i.e., blocks having a backward branch to the header of the loop) are also colored red so that threads are reconverged before the next loop iteration. The loop header block is the destination of the loop's backward edge, while the loop preheader is the only predecessor of the header outside the loop. All other blocks are colored white by default.

Line 2 in SPOINTSTOPJOINS indicates that the basic blocks in the program are traversed according to a reversed order of the dominator tree. Thus, each block B is visited by the routine before its immediate dominator idom(B) is visited. The main loop of SPOINTSTOPJOINS (lines 2-15) propagates colors and modifies the program based on four conditions: 1) B is white, 2) B post-dominates the immediate dominator of B, 3) the immediate dominator of B is the unique predecessor of B, and 4) a default condition in which none of the previous conditions are true.

The first condition, in which B is white or is the entry block of the program, is handled at lines 3 and 4. If the block B is white when it is visited or is the entry block, no further action is taken, and the SPOINTSTOPJOINS routine continues (line 4) to the next block.

The second condition, in which the immediate dominator of B is post-dominated by B, is handled at lines 5-9. If the immediate dominator of B (idom(B)) is also post-dominated by B, then the color of idom(B) is raised to at least yellow (line 6). That is, an idom(B) that is white becomes yellow, and an idom(B) that is red is left unchanged. Since the first condition in line 3 is not true, B is either yellow or red. At line 7, if B is red, then a pjoin is inserted at the top of B, as provided at line 8.

At lines 5-9, the block B being visited could have been previously assigned the color yellow if it is an immediate dominator of a previously visited red or yellow block. In this case, the immediate dominator of B is set to yellow, and no pjoin is inserted in block B. At line 9, the loop continues to process the next block according to the reverse dominator tree traversal order.

The third condition, in which the immediate dominator of B is also the unique predecessor of B, is handled at lines 10-13. In this case, idom(B) is the only block from which B is reached in the CFG. For example, if idom(B) is a block immediately preceding an if-else statement and B represents code in one of the if or else alternatives, then idom(B) dominates B and is a unique predecessor of B. In this case, a pjoin is not needed in B; instead, the SPOINTSTOPJOINS routine ensures that threads are already merged at idom(B) prior to reaching B. Accordingly, the pjoin can be placed as early as possible in the CFG.

The if conditional statement at line 11 specifies the natural case where idom(B) is in the same loop as B or idom(B) is in a parent loop. That is, B and idom(B) are in the same loop, or B is the header of a loop that is nested inside the loop containing idom(B), respectively. In this case, idom(B) is assigned the color red at line 12.

The if conditional statement at line 11 excludes the case where B is a block after a loop; for example, idom(B) is the last block of the loop and B is the block immediately following the loop. In this case, no blocks are colored red. No additional pjoin is needed because, for a program in the normal form, each loop has a unique exit block.

The new block $F_B$ post-dominates the correct branches to be rejoined and is a unique predecessor of $B_n$, thus ensuring the appropriate reconvergence when a pjoin is inserted in $F_B$ or in a control flow path leading uniquely to $F_B$. When $F_B$ is visited by the main loop, the if condition at line 10 is true, and lines 11 and 12 are executed with $F_B$ as block B.

Table 6 below shows modifications that can be made to the SPOINTSTOPJOINS routine so that it determines the set $A_B$ of arcs for each basic block B during the main loop traversal.

TABLE 6

| | SPOINTSTOPJOINS' |
|---|---|
| 1 | color[B] ← . . . |
| 2 | arcs[B] ←outgoing arcs of B except for self-loops |
| 3 | for . . . , with dominator tree children visited in the pre-determined order |
| 4 | do . . . |
| 5 | if rerouting for B |
| 6 | then Reroute using $A_B$ = arcs[idom(B)] |
| 7 | arcs[idom(B)] ←outgoing arcs of $F_B$ |
| | ▷ The following also executes when we hit a continue statement of the loop: |
| 8 | arcs[idom(B)] ← arcs[idom(B)] \ { incoming arcs of B } ∪ arcs[B] |

The default condition is handled at lines 14-15 when none of the first, second, or third conditions are true. Block B does not post-dominate idom(B), and also has more predecessors in addition to idom(B). Therefore, the color of idom(B) is set to yellow, and control flow for block B is rerouted.

Figure 8A:
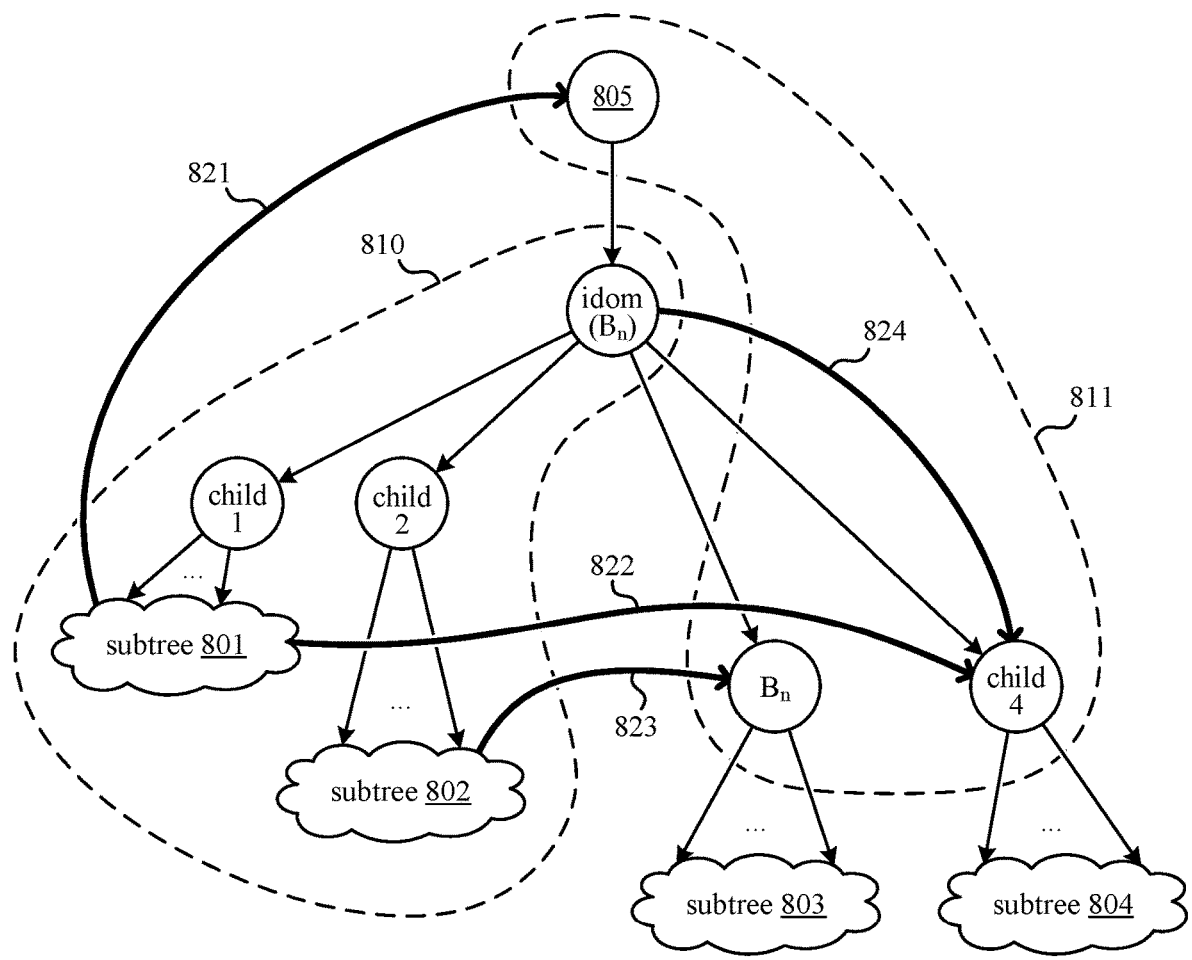
FIGS. 8A and 8B illustrate rerouting of edges through a flow block in a control flow graph, according to an embodiment.
Figure 8B:
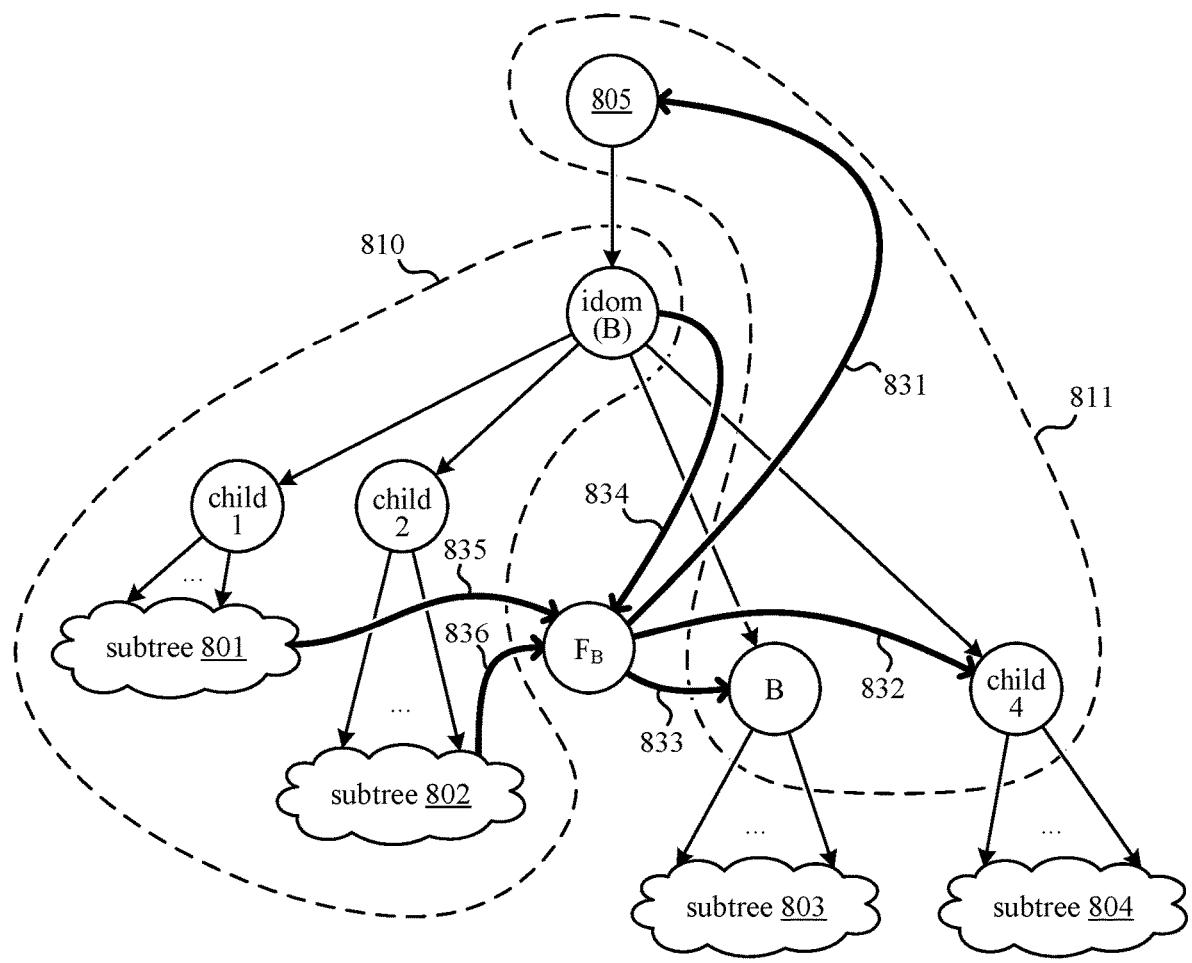

FIGS. 8A and 8B illustrate the rerouting of arcs for a block $B_n$, according to an embodiment. In general, rerouting the arcs for block $B_n$ entails determining which arcs should be rerouted in order to merge control flow at $B_n$ based on an ordering of the children of idom($B_n$) that extends the partial order A≤$B_n$ (A precedes $B_n$, where A represents a child of idom($B_n$)), where A≤$B_n$ if there is a path from A to $B_n$ that lies in the region strictly dominated by idom($B_n$). The rerouting of control flow for basic block $B_n$ in line 15 of SPOINTSTOPJOINS first determines the set $A_B$ of arcs from idom($B_n$) and from basic blocks dominated by children of idom($B_n$) that come before $B_n$ in the pre-determined ordering of children and going to $B_n$ or to later children of idom($B_n$) or to basic blocks outside the dominance region of idom($B_n$).

In FIG. 8A, the children of idom($B_n$) include child 1, child 2, $B_n$, and child 4, ordered respectively. These child blocks dominate the respective subtrees 801, 802, 803, and 804. Each of these subtrees 801-804 contains a set of basic blocks. Subset 810 includes idom($B_n$) and basic blocks dominated by children of idom($B_n$) (e.g., blocks in subtrees 801 and 802). Subset 811 includes $B_n$ and later children of idom($B_n$) (e.g., child 4, which is later than $B_n$ in the ordering), and basic blocks outside the dominance region of idom($B_n$) (e.g., block 805, which is the immediate dominator of idom($B_n$)). The straight arrows between blocks indicate dominance relationships, while curved arrows 821, 822, 823, and 824 represent arcs in the control flow graph. For simplicity, arcs 821 and 822 originate from the same block somewhere in subtree 801. Each of the arcs 821-824 begins at a block in set 810 and ends at a block in set 811; thus each of the arcs 821-824 is in the set $A_B$ of arcs that will be rerouted through a new flow block $F_B$. FIG. 8B illustrates the addition of the new flow block $F_B$ for rerouting arcs 821-824 for block B. Arc 821 is replaced with arcs 835 and 831, arc 822 is replaced with arcs 835 and 832, arc 823 is replaced with arcs 836 and 833, and arc 824 is replaced with arcs 834 and 832.

In SPOINTSTOPJOINS' shown in Table 6, lines 1, 3, and 4 correspond to lines 1, 2, and 3 of the original SPOINTSTOPJOINS routine. Line 2 is added between lines 1 and 2 of the original SPOINTSTOPJOINS routine. Lines 5-7 are executed if the original line 15 is executed. Line 8 is executed for each block (even white blocks) to update a set of arcs being collected. As the SPOINTSTOPJOINS' routine traverses the blocks, it keeps track of the relevant outgoing arcs of each block B, by adding the relevant arcs to the arc map of B (i.e., arcs[B]). Relevant arcs are also added to the arc map of idom[B] (i.e., arcs[idom(B)]) when B is being visited.

Arcs are added to a set arcs[B] for each block B being visited in line 2 of SPOINTSTOPJOINS'. For example, arc 822 is added to a set arcs[$B_m$] when its originating block $B_m$ is visited. $B_m$ is visited prior to $B_n$. Upon reaching a continue statement, line 8 executes to assign the arcs[$B_m$], including arc 822, to a set of arcs for idom[$B_m$]. The incoming arcs of $B_m$ are also excluded from arcs[idom($B_m$)] at line 8. Thus, relevant arcs are collected for each block B and propagated upward in the dominator tree.

When arcs are rerouted through a new flow block $F_B$ for a block B, arcs[idom(B)] is used as the set $A_B$ of arcs that are rerouted through the flow block $F_B$, as provided at line 6. The destination of each arc in the set $A_B$ is set to $F_B$. A new arc is created from $F_B$ to each block that is a destination of an arc in $A_B$. For example, arc 822 is in set $A_B$; therefore, the destination of arc 822 is set to $F_B$. Arc 822 thus corresponds to arc 835 in FIG. 8B. A new arc 832 is added from $F_B$ to the original destination of arc 822, which is child 4. In line 7, the new outgoing arcs of $F_B$ are associated with idom(B), since they may be rerouted in a subsequent iteration.

In one embodiment, compiler optimization transformations can be overly restricted by an abundance of unnecessary pjoin statements. Thus, after performing the SpointsToPjoins routine at 427, the transformation process 100 continues at 429 to remove redundant pjoins from the pjoin representation 409. The pjoin representation 409 includes a set of pjoin statements, which further includes principal pjoin statements, which should not be removed, and redundant or non-essential pjoin statements that are removed.

For each block J containing a principal pjoin in the pjoin representation 409, the following conditions are true:

(1) There is a cross-lane operation that is reachable from J without passing through a postdominating Pjoin J' that post-dominates J, and (2) There are non-uniform conditional branches in the region of code that is post-dominated by J but not post-dominated by any children of J in the post-dominator tree that contain a pjoin.

Thus, each principal pjoin in the pjoin representation 409 is identified by determining that 1) a cross-lane operation is reachable from the block J without passing through any other post-dominating join statement that post-dominates J, and 2) at least one non-uniform conditional branch exists in a region of the post-dominating join representation that is post-dominated by J, and is not post-dominated by any children of J in the post-dominator tree that contain a pjoin.

In some cases, removing a non-essential pjoin can cause another non-essential pjoin to become a principal pjoin. One example is shown in Table 7 below.

TABLE 7

Principal pjoins example

| | |
|---|---|
| 1 | if (divergent_condition) { |
| 2 | use(ballot(...)); |
| 3 | } |
| 4 | Pjoin( ); |
| 5 | if (uniform_condition) { |
| 6 | ... |
| 7 | } |
| 8 | Pjoin( ); |
| 9 | use(ballot(...)); |

In Table 7, the pjoins at lines 4 and 8 are both non-essential; however, removing either of them causes the other one to become a principal pjoin, which if removed, changes the semantics of the program. If only one of the pjoin statements is removed, threads diverging at the first if statement in line 1 are still reconverged at the remaining pjoin statement prior to reaching the final ballot( ) at line 9. Removing both pjoin statements changes the semantics of the program because convergence of threads that diverged at the first if statement in line 1 is no longer guaranteed before the final ballot( ) at line 9.

In one embodiment, a routine for removing redundant pjoin statements 429 identifies the principal pjoin statements in the pjoin representation 409 for which the conditions 1) and 2) above are true. According to one routine, while any redundant pjoin statement J remains in the pjoin representation 409, the routine removes the pjoin statement J. Thus, pjoin statements that become principal due to the removal of another pjoin statement are not removed.

Figures 9A, 9B:
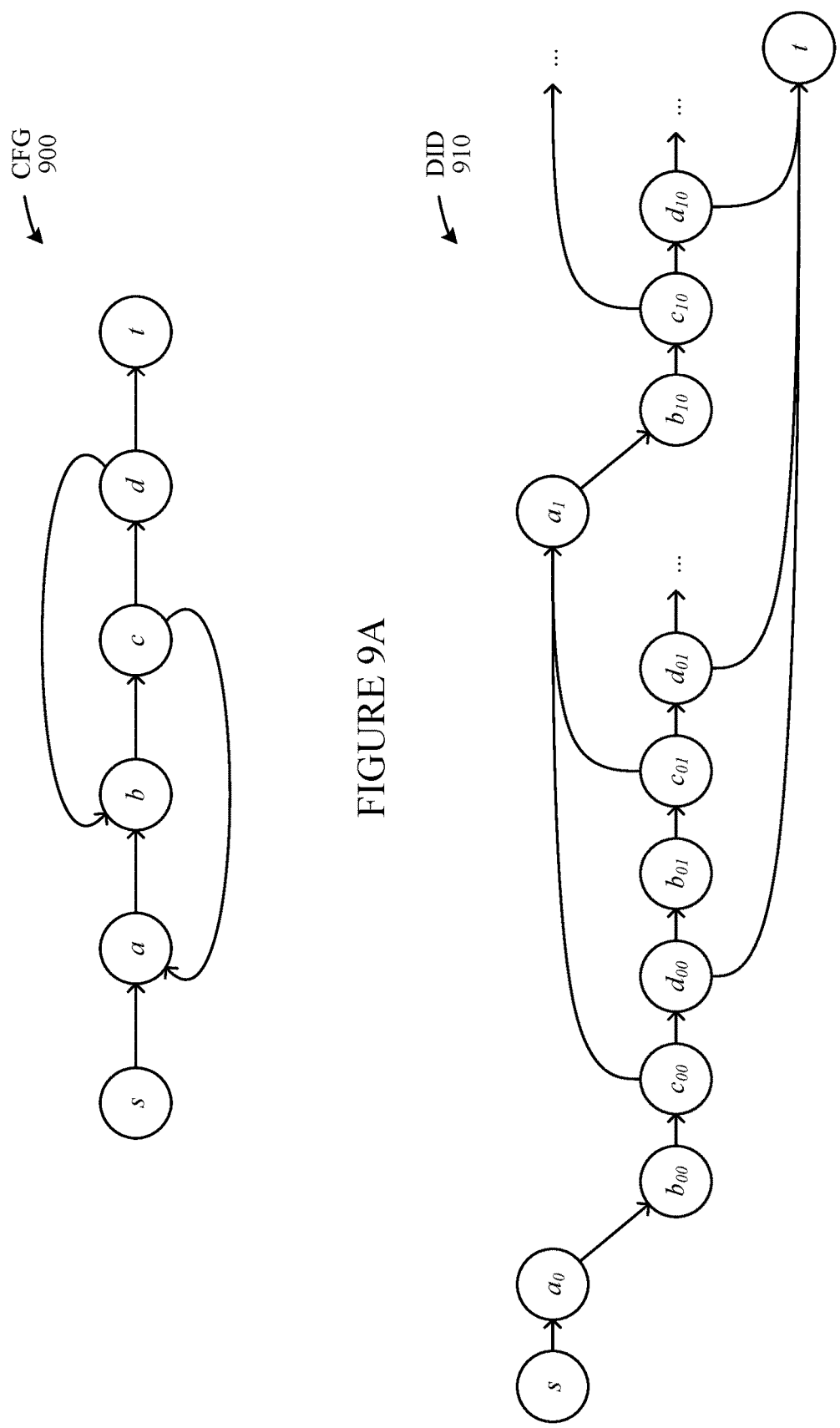
FIG. 9A illustrates an original control flow graph of a program, according to an embodiment.
FIG. 9B illustrates a DID representing the intended execution of the program, according to an embodiment.

FIGS. 9A-9F illustrates the transformation of a program via structure point insertion and replacement of the structure points with pjoin calls, according to an embodiment. FIG. 9A illustrates a CFG 900 that could arise from a high-level language program with multi-level break and continue statements. The CFG 900 could also be the result of branch optimizations that transformed the CFG 900 to have the multi-level break and continue features that were not present in the original program. The CFG 900 has nested natural loops with overlapping latch and exit blocks. The inner loop contains blocks b, c, and d, with a latch block d and exit blocks c and d. The outer loop contains blocks a, b, c, and d, with a latch block c and exit block d.

FIG. 9B illustrates a DID 910 representing the likely intended execution of the original high-level program, assuming that the original program had nested loops. Thus, the transformation process 100 aims to generate a CFG that will enforce the execution flow represented by the DID 910.

Figure 9C:
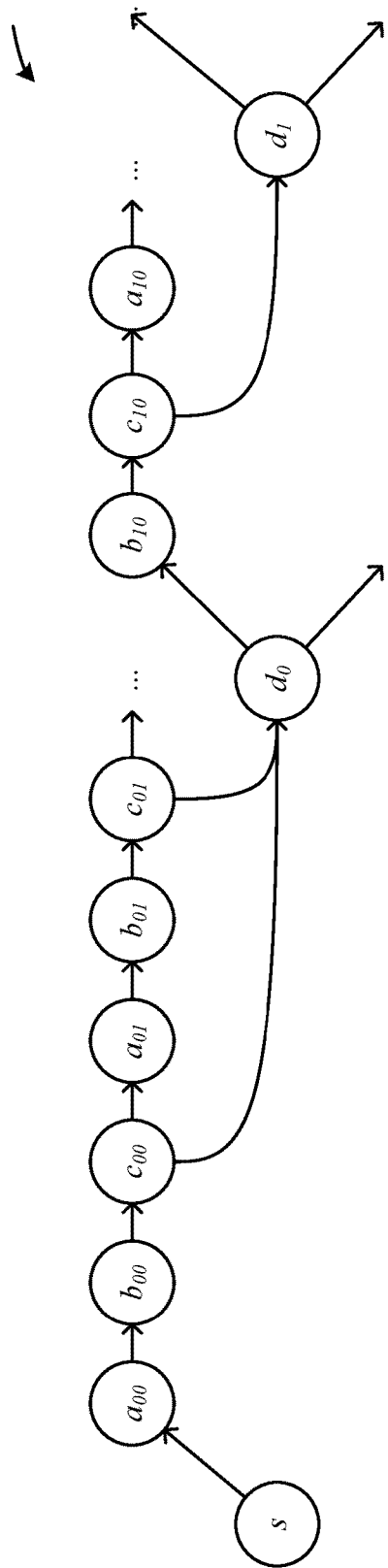
FIG. 9C illustrates part of a conformant DID representing execution of the program, according to an embodiment.

FIG. 9C illustrates part of a conformant DID 920 representing execution of the program when a pjoin is included in block d. The conformant DID 920 is essentially unique, except that convergence may or may not occur in block t. Adding a pjoin in block t enforces convergence of threads in t. Pjoins added in a, b, or c would have no effect, since those blocks do not post-dominate any branch instructions.

Referring back to the original CFG 900, structure points are inserted in the program as provided at 421 in the transformation process 100. An sanchor is placed in block a, and an sjoin is placed in block c. In normalized form, every cycle containing a structure point also contains its anchor; however, the sjoin in block c is also in the inner loop containing b, c, and d, which does not include its sanchor in block a.

Figure 9D:
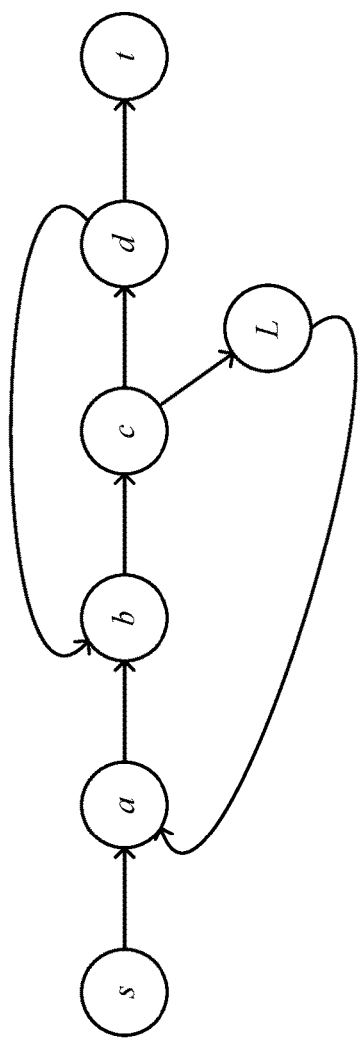
FIGS. 9D and 9E illustrate stages in the normalization of the control flow graph of the program, according to an embodiment.

Therefore, a new latch block L is added, splitting the backward edge from block c to block a, as provided at 707 of the normalization process 425, which identifies natural loops and reroutes backward edges through a new unique latch block. The modified CFG 930 is illustrated in FIG. 9D. The sjoin anchored in block a is instead placed in the new latch block L, since L is not part of the inner loop. FIG. 9D illustrates the CFG 930 after the latch block L is added to the outer loop.

Figure 9E:
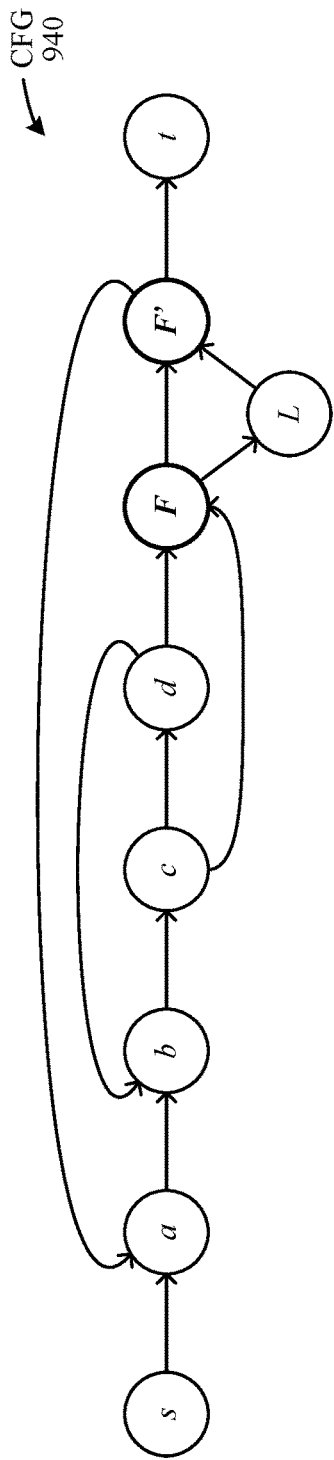

The resulting CFG 930 still lacks a designated post-dominator (normal form condition 6) for the sanchor in block a, and the inner loop has two exit blocks, t and L (contrary to normal form condition 3). The normalization process adds flow blocks F and F' to enforce these conditions. The resulting CFG 940 is shown in FIG. 9E.

The CFG 940 is further processed by the SPOINTSTOPJOINS routine. Upon visiting block L, the conditional at line 10 of SPOINTSTOPJOINS is true; block F, the immediate dominator of L, is the unique predecessor of L. At line 11, the innermost containing loop of block F also contains L, so line 12 executes. Block F is assigned the color red, and a pjoin is inserted in block F.

Upon reaching block F, the immediate dominator of block F is block c. Block F post-dominates block c, so the condition at line 5 of SPOINTSTOPJOINS is triggered, and block c is assigned the color yellow. Block F' is the latch block of the outer loop so F' will be assigned the color red. For block F', the immediate dominator is block F. Block F' also post-dominates block F, so the condition at line 5 is triggered in SPOINTSTOPJOINS. At line 7, the color of F' is red, so a pjoin is inserted in F'. This ensures reconvergence of the loop.

Block d is a latch block and is also assigned the color red; however, idom(d) is the unique predecessor of block d so lines 10-13 are executed for block d. A pjoin is not inserted in d, and block c (as the immediate dominator of block d) is assigned the color red. Block c is the post-dominator of idom(c) so a pjoin is inserted in block c, per lines 5-9. Ultimately, pjoins are inserted into each of blocks c, F and F'.

Figure 9F:
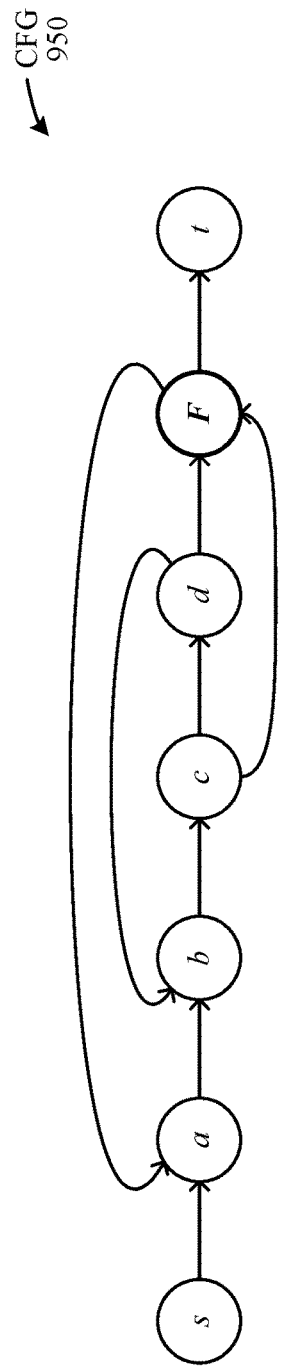
FIG. 9F illustrates a reconverging control flow graph for the program, according to an embodiment.

The simplified version of CFG 940 is illustrated in FIG. 9F as CFG 950. Since block L is empty, it is removed. Blocks F and F' are reduced to a single flow block F. From CFG 950, redundant pjoin calls are removed as provided at 429 in transformation process 100. The CFG 950 is already in a reconverging form, so additional flow blocks need not be inserted according to 433 in process 100. The final CFG 950 thus provides the post-dominating blocks and pjoin statements at which threads can reconverge so that cross-lane operations function as expected.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing device 300 and/or portions thereof carried on the computer-readable storage medium may be a database or other data structure which can be read by a program and used, directly or indirectly, to fabricate the hardware including the computing device 300. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing device 300. The netlist may then be placed and routed to produce a data set describing geometric shapes to be applied to masks. The masks may then be used in various semiconductor fabrication steps to produce a semiconductor circuit or circuits corresponding to the computing device 300. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A computing system, comprising:
 a processor;
 a memory storing instructions for a compiler that, when executed by the processor, cause the processor to generate a control flow graph of program source code by:
  receiving the program source code in the compiler, wherein the program source code includes one or more divergent branches;
  in the compiler, generating a structure point representation based on the received program source code by inserting into the program source code a set of structure points including an anchor structure point and a join structure point associated with the anchor structure point; and
  based on the structure point representation, generating the control flow graph including a plurality of blocks each representing a portion of the program source code, wherein, in the control flow graph, a block A between the anchor structure point and the join structure point post-dominates each of the one or more divergent branches between the anchor structure point and the join structure point.

2. The computing system of claim 1, wherein:
 generating the structure point representation further comprises inserting a set of structure points based on locations of flow control statements in the program source code;
 the set of structure points includes the join structure point and one or more tip structure points associated with the anchor structure point; and
 in the control flow graph, a block B containing the join structure point excludes all of the one or more tip structure points.

3. The computing system of claim 2, wherein the inserting further comprises, in the program source code:
 inserting one of a first plurality of join structure points immediately following each if conditional statement in the program source code;
 inserting one of a second plurality of join structure points immediately following each switch statement and each case statement reachable by fallthrough in the switch statement; and
 inserting the anchor structure point at a location immediately preceding a loop condition evaluation.

4. The computing system of claim 1, wherein generating the control flow graph comprises:
 generating an initial version of the control flow graph based on the structure point representation; and
 performing a set of compiler optimizations by modifying the initial version of the control flow graph.

5. The computing system of claim 1, wherein generating the control flow graph comprises:
 converting the structure point representation to a normal form control flow graph, wherein any join structure points of the set of structure points that are located in the same block in the normal form control flow graph are associated with no more than one anchor structure point;
 in the normal form control flow graph, for each block B that excludes any anchor structure point or join structure point, in response to determining that a block C that is an immediate dominator of block B is not post dominated by block B, and that block C is not a unique predecessor of block B:
    inserting a flow block F,
    creating a new arc FB between flow block F and block B, and
    for each arc of a set of arcs ending at block B, rerouting the arc to flow block F; and
inserting a post-dominating join statement in block A.

6. The computing system of claim 1, wherein the instructions, when executed by the processor, further cause the processor to generate the control flow graph by:
    transforming the structure point representation to a post-dominating join representation including a set of post-dominating join statements; and
    identifying one or more principal post-dominating join statements in the set of post-dominating join statements by, for each of the one or more principal post-dominating join statements:
    determining that a cross-lane operation is reachable from a block J containing the principal post-dominating join statement without passing through any other post-dominating join statement that post-dominates the principal post-dominating join statement in the post-dominating join representation; and
    determining that at least one non-uniform conditional branch exists in a region of the post-dominating join representation that:
        is post-dominated by the block J containing the principal post-dominating join statement, and
        is not post-dominated by any children of block J in a post-dominator tree that includes block J.

7. The computing system of claim 6, wherein the instructions, when executed by the processor, further cause the processor to generate the control flow graph by:
    generating a first post-dominator tree based on the program source code;
    generating a second post-dominator tree based on traversing the first post-dominator tree, wherein the second post-dominator tree includes a set of vertices each representing one of the set of post-dominating join statements, and a set of edges each representing a post-dominance relationship between two of the post-dominating join statements in the set of post-dominating join statements; and
    simplifying the post-dominating join representation by removing a set of nonessential post-dominating join statements of the set of post-dominating join statements, wherein the set of nonessential post-dominating join statements excludes the one or more principal post-dominating join statements.

8. A method, comprising:
    receiving program source code in a compiler, wherein the program source code includes one or more divergent branches;
    in the compiler, generating a structure point representation based on the received program source code by inserting into the program source code a set of structure points including an anchor structure point and a join structure point associated with the anchor structure point; and
    based on the structure point representation, generating a control flow graph including a plurality of blocks each representing a portion of the program source code, wherein, in the control flow graph, a block A between the anchor structure point and the join structure point post-dominates each of the one or more divergent branches between the anchor structure point and the join structure point.

9. The method of claim 8, wherein:
    generating the structure point representation further comprises inserting a set of structure points based on locations of flow control statements in the program source code;
    the set of structure points includes the join structure point and one or more tip structure points associated with the anchor structure point; and
    in the control flow graph, a block B containing the join structure point excludes all of the one or more tip structure points.

10. The method of claim 9, wherein the inserting further comprises, in the program source code:
    inserting one of a first plurality of join structure points immediately following each if conditional statement in the program source code;
    inserting one of a second plurality of join structure points immediately following each switch statement and each case statement reachable by fallthrough in the switch statement; and
    inserting the anchor structure point at a location immediately preceding a loop condition evaluation.

11. The method of claim 8, wherein generating the control flow graph comprises:
    generating an initial version of the control flow graph based on the structure point representation; and
    performing a set of compiler optimizations by modifying the initial version of the control flow graph.

12. The method of claim 8, wherein generating the control flow graph comprises:
    converting the structure point representation to a normal form control flow graph, wherein any join structure points of the set of structure points that are located in the same block in the normal form control flow graph are associated with no more than one anchor structure point;
    in the normal form control flow graph, for each block B that excludes any anchor structure point or join structure point, in response to determining that a block C that is an immediate dominator of block B is not post dominated by block B, and that block C is not a unique predecessor of block B:
    inserting a flow block F,
    creating a new arc FB between flow block F and block B, and
    for each arc of a set of arcs ending at block B, rerouting the arc to flow block F; and
inserting a post-dominating join statement in block A.

13. The method of claim 8, further comprising:
    transforming the structure point representation to a post-dominating join representation including a set of post-dominating join statements; and
    identifying one or more principal post-dominating join statements in the set of post-dominating join statements by, for each of the one or more principal post-dominating join statements:
        determining that a cross-lane operation is reachable from a block J containing the principal post-dominating join statement without passing through any other post-dominating join statement that post-dominates the principal post-dominating join statement in the post-dominating join representation; and determining that at least one non-uniform conditional branch exists in a region of the post-dominating join representation that:
is post-dominated by the block J containing the principal post-dominating join statement, and
is not post-dominated by any children of block J in a post-dominator tree that includes block J.

14. The method of claim 13, further comprising:
generating a first post-dominator tree based on the program source code;
generating a second post-dominator tree based on traversing the first post-dominator tree, wherein the second post-dominator tree includes a set of vertices each representing one of the set of post-dominating join statements, and a set of edges each representing a post-dominance relationship between two of the post-dominating join statements in the set of post-dominating join statements;
simplifying the post-dominating join representation by removing a set of nonessential post-dominating join statements of the set of post-dominating join statements, wherein the set of nonessential post-dominating join statements excludes the one or more principal post-dominating join statements.

15. The method of claim 8, further comprising:
transforming the control flow graph into a reconverging form of the control flow graph by inserting into the control flow graph at least one flow block between two blocks of the control flow graph.

16. The method of claim 8, further comprising:
modifying the control flow graph for wave-level control flow by inserting into the control flow graph one or more mask handling instructions for updating execution mask values and rejoin mask values.

17. A non-transitory computer readable storage medium storing instructions for a compiler, wherein the instructions are executable by a processor to:
receive program source code in the compiler, wherein the program source code includes one or more divergent branches;
in the compiler, generate a structure point representation based on the received program source code by inserting into the program source code a set of structure points including an anchor structure point and a join structure point associated with the anchor structure point; and
based on the structure point representation, generate a control flow graph including a plurality of blocks each representing a portion of the program source code, wherein, in the control flow graph, a block A between the anchor structure point and the join structure point post-dominates each of the one or more divergent branches between the anchor structure point and the join structure point.

18. The non-transitory computer readable storage medium of claim 17, wherein the instructions are further executable by the processor to:
transform the control flow graph into a reconverging form of the control flow graph by inserting into the control flow graph at least one flow block between two blocks of the control flow graph; and
generate a wave level control flow graph by inserting into the reconverging control flow graph one or more mask handling instructions for updating execution mask values and rejoin mask values.

19. The non-transitory computer readable storage medium of claim 17, wherein:
generating the structure point representation further comprises:
inserting one of a first plurality of join structure points immediately following each if conditional statement in the program source code,
inserting one of a second plurality of join structure points immediately following each switch statement and each case statement reachable by fallthrough in the switch statement, and
inserting the anchor structure point at a location immediately preceding a loop condition evaluation; and
the set of structure points includes the join structure point and one or more tip structure points associated with the anchor structure point; and
in the control flow graph, a block B containing the join structure point excludes all of the one or more tip structure points.

20. The non-transitory computer readable storage medium of claim 17, wherein the instructions are further executable by the processor to:
transform the structure point representation to a post-dominating join representation by inserting a post-dominating join statement in block A.

* * * * *